United States Patent
Diehl

(10) Patent No.: US 9,446,868 B2
(45) Date of Patent: Sep. 20, 2016

(54) PACKAGING MACHINE AND PACKAGING METHOD WITH GENERATION OF PRESSURIZED AIR

(75) Inventor: Martin Diehl, Waltenhofen (DE)

(73) Assignee: MULTIVAC SEPP HAGGENMUELLER SE & CO. KG, Wolfertschwenden (DE)

( * ) Notice: Subject to any disclaimer, the term of this patent is extended or adjusted under 35 U.S.C. 154(b) by 521 days.

(21) Appl. No.: 13/100,698

(22) Filed: May 4, 2011

(65) Prior Publication Data
US 2011/0296799 A1 Dec. 8, 2011

(30) Foreign Application Priority Data
May 6, 2010 (DE) .......................... 10 2010 019 636

(51) Int. Cl.
| | | |
|---|---|---|
| B65B 61/00 | (2006.01) | |
| B65B 9/04 | (2006.01) | |
| B65B 47/10 | (2006.01) | |
| B29C 51/08 | (2006.01) | |
| B29C 51/46 | (2006.01) | |

(52) U.S. Cl.
CPC .................. *B65B 9/04* (2013.01); *B65B 47/10* (2013.01); *B29C 51/082* (2013.01); *B29C 51/46* (2013.01); *B29C 2793/009* (2013.01)

(58) Field of Classification Search
CPC ... B65B 47/10; B29C 51/082; B29C 51/087; B29C 51/46; B29C 51/10; B29C 2793/009
USPC ............... 264/549, 500, 551, 553, 554, 555; 425/346, 347, 348 R, 112, 125, 388, 425/387.1, 403, 412, 419, 423, 405.1
See application file for complete search history.

(56) References Cited

U.S. PATENT DOCUMENTS

| | | |
|---|---|---|
| 2,724,225 A | 11/1955 | Haidegger |
| 4,012,888 A | 3/1977 | Nichols |
| 4,069,645 A | 1/1978 | Vetter |
| 6,692,684 B1 * | 2/2004 | Nantin et al. ................. 264/521 |
| 2006/0013916 A1 * | 1/2006 | Azzar et al. ................. 425/437 |

(Continued)

FOREIGN PATENT DOCUMENTS

| | | |
|---|---|---|
| DE | 1255294 B | 11/1967 |
| DE | 3111925 A1 | 10/1982 |
| DE | 10327092 A1 | 12/2004 |
| GB | 1131857 | 10/1968 |

OTHER PUBLICATIONS

Extended European Search Report Dated Oct. 14, 2011, Applicant Multivac Sepp Haggenmueller GmbH & Co. KG, Application No. EP68108GMilg, 4 Pages.

(Continued)

*Primary Examiner* — James Sanders
*Assistant Examiner* — Ninh Le
(74) *Attorney, Agent, or Firm* — Husch Blackwell LLP

(57) ABSTRACT

The present invention refers to a packaging machine (1) comprising at least one workstation (2, 3, 4) and a device (11) for generating compressed air. The invention is characterized in that the device (11) for generating compressed air is connected to a lifting gear (21) of the workstation (2, 3, 4), wherein the device (11) is drivable by the movement of the lifting gear (21) of the workstation (2, 3, 4). The invention also refers to a method for operating a corresponding packaging machine (1).

13 Claims, 2 Drawing Sheets

(56) References Cited

U.S. PATENT DOCUMENTS

| | | |
|---|---|---|
| 2006/0068048 A1* | 3/2006 | Koda et al. .................. 425/3 |
| 2006/0089805 A1* | 4/2006 | Enis et al. .................. 702/2 |
| 2009/0071100 A1* | 3/2009 | Ehrmann et al. ............ 53/84 |
| 2009/0173049 A1* | 7/2009 | Ruzic et al. ................ 53/542 |
| 2009/0289397 A1* | 11/2009 | Kleemeier .................. 264/571 |
| 2010/0107572 A1* | 5/2010 | Slomp et al. ............... 53/559 |

OTHER PUBLICATIONS

German Office Action Dated Jan. 14, 2011, Applicant Multivac Sepp Haggenmueller GmbH & Co. KG, Application No. 10 2010 019 636.3-27, 3 Pages.

\* cited by examiner

PACKAGING MACHINE AND PACKAGING METHOD WITH GENERATION OF PRESSURIZED AIR

CROSS-REFERENCE TO RELATED APPLICATIONS

This application claims priority to German Application No. 102010019636.3 filed May 6, 2010, the disclosure of which is incorporated in its entirety by reference.

TECHNICAL FIELD

The present invention refers to a packaging machine and to a method for operating a packaging machine.

BACKGROUND

Packaging machines are normally available in production halls in which a central compressed-air supply is available to feed all kinds of production machines with compressed air. Specifically in deep-draw packaging machines compressed air is needed for deep-drawing and/or forming cavities into the lower foil web. Likewise, for the sealing operation compressed air is needed for generating the contact pressure of the upper film web onto the lower film web, which contact pressure is required for the sealing process.

In small food processing companies or butcher shops there are no central compressed-air supplies. However, deep-draw packaging machines should also be used in this sector. In such companies it would be of advantage if the deep-draw packaging machine only needed an electrical connection, and further media connections for media such as compressed air, vacuum and cooling water are not required.

SUMMARY

It is the object of the present invention to provide a packaging machine and a method for operating such a packaging machine in which the above-described requirements are satisfied.

In packaging machines, particularly deep-draw packaging machines, the drives of the film feed of the lower film and lifting systems of the workstation e.g. for molding, sealing and cutting are often motor-driven. For instance, a motor on the molding station for closing the chamber moves the lower part of the mold tool upwards by means of a lifting gear.

Subsequently, cavities are deep-drawn and formed, respectively, by means of compressed air and/or vacuum into a film web heated by a heating plate. With a subsequent downward movement of the lower part of the mold tool the chamber is opened again and the film web with the molded cavities is transported further by the film feed.

The upward and downward movement of the lower part of the mold tool is carried out by a lifting gear which converts the movement of the motor drive into a lifting movement. According to the inventive packaging machine this machine has a device for generating compressed air so as to be able to dispense with supplied compressed air from the outside. This device for generating compressed air is driven by the movement of the lifting gear of the workstation.

Advantageously, the movement of the lifting gear is vertical. Due to the weight above all of the lower part of the mold tool, there will be maximum efficiency when the downward direction of movement is exploited in the lifting gear.

One or both directions of movement can here be used for driving the device for generating compressed air. However, it may be necessary that both directions of movement are used for driving the device if the demand for generated compressed air is correspondingly high or an increased pressure is needed.

Since the different processes such as heating the film web, molding, evacuating, gas-treating, sealing, cutting, feeding the film web, inserting products, lifting gear movements of the workstations, etc. are defined in the production process, it is advantageous according to the invention when the compressed air generated by the device is temporarily stored in a compressed-air store so as to make it available in the subsequent processes since these processes do not necessarily take place at the same time.

In the packaging machine according to the invention the device for generating the compressed air is e.g. connected via mechanical and/or hydraulic means to the lifting system of one or more workstations.

Advantageously, the device comprises a piston pump which exploits the movements of the lifting gear for compressing air. This compressed air is supplied to the compressed-air store and is stored and/or compressed there.

Advantageously, the workstation is configured as a molding station of a deep-draw packaging machine that drives the device for generating compressed air because on the molding station itself the compressed-air consumption is maximal and there are thus the least losses on account of short line lengths.

The device expediently comprises valves which are connected to a controller. The valves are controlled according to the movement of the lifting gear, the state of the compressed-air store and the process of the workstation.

In the method according to the invention for operating the packaging machine comprising a workstation and a device for generating compressed air, the device is driven by means of mechanical and/or hydraulic connection by the movement of the lifting gear of the workstation.

Subsequently, the generated compressed air is received in a compressed-air store for temporary storing. As a consequence, the compressed air is available for the processes at the required time.

Compressed air is advantageously generated in one or two successive work cycles of the workstation and this generated compressed air is at least partially used in the same work cycles. A work cycle e.g. of a molding station consists of the following repeating steps:

0. closing the molding station by moving the lower part of the mold tool upwards;
1. heating the film web by means of a heating plate in the upper part of the mold tool;
2. molding a cavity by supplying compressed air from the compressed-air store into the upper part of the mold tool and/or by applying a vacuum in the lower part of the mold tool;
3. venting the chamber and opening the molding station by moving the lower part of the mold tool downwards;
4. transporting the film web with the formed cavities out of the molding station by way of the film feed.

To achieve an efficiency factor that is as high as possible and to keep the energy costs low, the compressed air is generated in the method according to the invention in steps 3 and/or 0 and is used in the subsequent work cycle in step 2 for forming cavities into a film web in the molding station.

The generated compressed air is fed by means of valves, which are connected to a controller, to the compressed-air store and/or the workstation.

In further variants it is conceivable that a plurality of compressed-air stores are present or that further workstations such as sealing station or cutting stations jointly generate compressed air by way of their lifting gear movements by means of piston pumps or by devices of similar action and supply it to one or more compressed-air stores. Likewise, the compressed air in the compressed-air store(s) can be supplied to a plurality of workstations for corresponding process sequences.

In the following an advantageous embodiment of the invention is explained in more detail based on a drawing.

DETAILED DESCRIPTION

Figure 1:
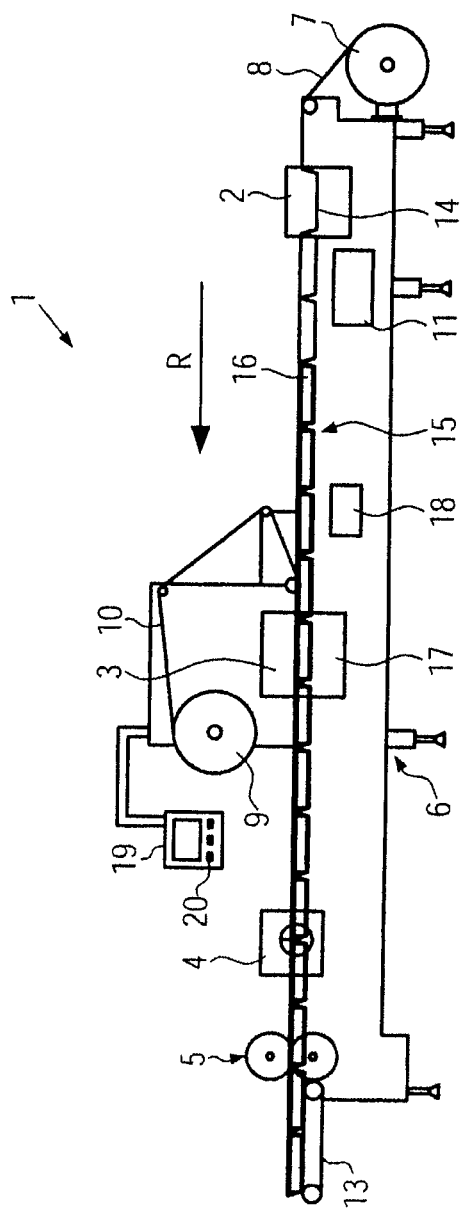
FIG. 1 is a schematic side view of a packaging machine according to the invention in the form of a deep-draw packaging machine.

In the figures identical components are designated with the same reference numerals throughout.

FIG. 1 shows a schematic view of a packaging machine 1 according to the invention in the form of a deep-draw packaging machine. This deep-draw packing machine 1 has a molding station 2, a sealing station 3, a transverse cutting device 4 and a longitudinal cutting device 5 which are arranged in this order in working direction R on a machine frame 6. At the input end on the machine frame 6 there is a feed roll 7 from which a film 8 is pulled off. In the region of the sealing station 3 a material store 9 is provided from which a lid film 10 is pulled off. At the output end on the packaging machine a removal device 13 in the form of a conveyor belt is provided with which finished, singled-out packages can be taken away. Furthermore, the packaging machine 1 has a feed device, which is not shown and which grips the film 8 to transport it further in the working direction R during each main operating cycle. The feed device can, for example, be realized using transport chains arranged on both sides.

In the illustrated embodiment the molding station 2 is formed as a deep-drawing station with which cavities 14 can be formed in the film 8 by deep drawing. Here, the molding station 2 can be formed such that several cavities can be formed adjacent to one another in the direction perpendicular to the working direction R. A device 11 for generating the compressed air needed for deep drawing is shown in the region after the molding station 2 and under an insertion section 15 in the machine interior. In the working direction R behind the molding station 2 the insertion section 15 is provided in which the cavities 14 formed in the film 8 are filled with the product 16.

The sealing station 3 has a closable chamber 17 in which the atmosphere in the cavities 14 can be replaced, for example by gas flushing with a replacement gas or with a gas mixture before sealing.

The transverse cutting device 4 is formed as a punch which parts the film 8 and the lid film 10 in a direction transverse to the working direction R between adjacent cavities 14. Here, the transverse cutting device 4 operates such that the film 8 is not parted over the complete width, but rather is not parted at least in a marginal region. This facilitates controlled further transport by the feed device.

In the illustrated embodiment the longitudinal cutting device 5 is formed as a cutter arrangement with which the film 6 and the lid film 10 are parted between adjacent cavities 14 and on the side edge of the film 8 so that singled-out packages are available behind the longitudinal cutting device 5.

The packaging machine 1 also has a controller 18. It has the task of controlling and monitoring the processes running in the packaging machine 1. A display device 19 with operating elements 20 is used for visualizing or influencing the process sequences in the packaging machine 1 for, respectively by, an operator.

The general principle of operation of the packaging machine 1 is briefly described in the following.

The film 8 is pulled off the feed roll 7 and transported through the feed device into the molding station 2. In the molding station 2 cavities 14 are formed in the film 8 by deep drawing. The cavities 14 are transported further together with the surrounding region of the film 8 in a main operating cycle to the insertion section 15 in which they are filled with the product 16.

Then the filled cavities 14 are transported into the sealing station 3 by the feed device in the main operating cycle together with the surrounding region of the film 8. The lid film 10 is transported further with the feeding movement of the film 8 after a process of sealing onto the film 8. Here the lid film 10 is pulled from the material store 9. By sealing the lid film 10 onto the cavities 14 closed packages are created which are transported singled-out in the following cutters 4 and 5 and transported out of the packaging machine by means of the removal device 13.

Figure 2:
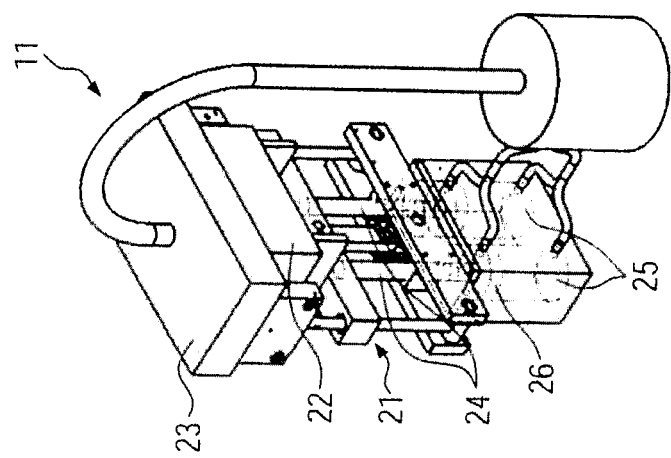
FIG. 2 is a schematic view of a device for generating compresses air.

FIG. 2 illustrates the device 11 for generating compressed air with a lifting gear 21 for the molding station 2. The lifting gear 21 moves a lower part of the mold tool 22 to the upper part of the mold tool 23, thereby forming a closed chamber. After the molding process the lifting gear 21 moves the lower part of the mold tool 22 downwards, thereby opening the chamber.

With the help of push rods 24, which are connected to the lifting gear 21 and two piston pumps 25, the air below the pistons 26 of the piston pumps 25 is compressed upon a downward lifting movement of the lifting gear 21. During the upward lifting movement the air above the pistons 26 can also be compressed.

Figure 3:
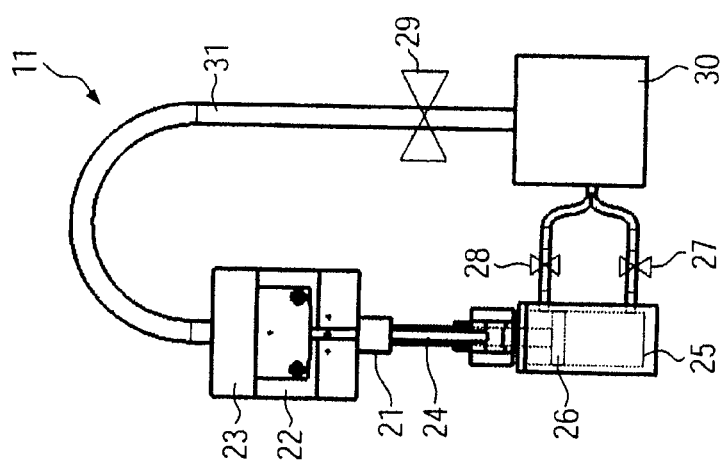
FIG. 3 is a schematic side view of a device with valves.

FIG. 3 shows valves 27, 28 and 29, as well as a compressed air store 30. Upon a downward movement of the lifting gear 21 the valves 28 and 29 are closed and the valve 27 is opened for feeding the air to the compressed air store 30 and to compress the air. The piston pump 25 above the piston 26 is here fed by a device (not shown) with ambient air.

Upon an upward movement of the lifting gear 21 the valves 27 and 29 are closed and the valve 28 is opened to feed the air to the compressed air store 30 and to compress it. The piston pump 25 below the piston 26 is here fed by a device (not shown) with ambient air.

After the lifting movements the valves 27 and 28 are closed and the compressed air is fed from the pressure store 30, after the valve 29 has been opened, via line 31 to the upper part of the mold tool 23 so as to form and deep-draw, respectively, the cavities 14 into the film web 8.

A sequence is also conceivable in which several lifting movements are carried out without consumption of the compressed air for a process, but for increasing the pressure in the compressed-air store 30.

The invention claimed is:

1. A packaging machine comprising:
    a forming station for forming one or more cavities in a packaging film by deep drawing, the forming station having a forming tool upper part, a forming tool lower part and a movable lifting gear, wherein the moveable lifting gear converts a movement of a motor drive into an upward and a downward movement of the forming tool lower part, wherein a closed chamber is formed by said forming tool upper part and said forming tool lower part upon the upward movement of the forming tool lower part;
    a device for generating compressed air, the device disposed outside of said closed chamber and connected to the lifting gear of the forming station, wherein the lifting gear is drivingly engaged with the device such that the device generates compressed air during both the upward and the downward lifting movement of the lifting gear;
    a compressed air store for storing a volume of the compressed air generated by said device for generating compressed air, said compressed air store in fluid communication with said device for generating compressed air and said forming tool upper part, wherein said compressed air store receives a volume of compressed air from said device for generating compressed air during both the upward and the downward lifting movement of the lifting gear; and
    two valves for controlling a path of the fluid communication, said two valves disposed between said compressed air store and said device for generating compressed air for directing compressed air into the compressed air store during both the upward and the downward lifting movement of the lifting gear;
    wherein said one or more cavities are at least partially formed in a portion of the packaging film disposed within said closed chamber by releasing some of said volume of compressed air in said compressed air store into said closed chamber through said forming tool upper part.

2. The packaging machine as claimed in claim 1 wherein the lifting gear of the forming station is movable vertically.

3. The packaging machine as claimed in claim 1 wherein the device for generating compressed air is connected to the lifting gear of the workstation via mechanical, pneumatic and/or hydraulic means.

4. The packaging machine as claimed in claim 1 wherein the device for generating compressed air comprises a piston pump.

5. The packaging machine as claimed in claim 1 wherein the device for generating compressed air comprises a controller and valves connected to the controller.

6. The packaging machine as claimed in claim 1 further comprising a sealing station for sealing a product in said cavities of said packaging film, said sealing station downstream of said forming station in a working direction.

7. The packaging machine as claimed in claim 6 further comprising an insertion section for filling said cavities in said packaging film with said product, said insertion section being downstream of said forming station and upstream of said sealing station in said working direction.

8. The packaging machine as claimed in claim 1 further comprising said packaging film being transported through said packaging machine in a working direction.

9. The packaging machine as claimed in claim 8 further comprising an insertion section for filling said cavities in said packaging film with a product, a sealing station for sealing said product in said cavities of said packaging film, and wherein said packaging film being transported through said forming station, said insertion section, and said sealing station.

10. The packaging machine as claimed in claim 1 further comprising a feed device for transporting the packaging film in a working direction.

11. The packaging machine as claimed in claim 10 wherein said feed device sequentially advances said packaging film after said downward movement of said forming tool lower part.

12. The packaging machine as claimed in claim 10 further comprising:
    an insertion section for filling said cavities in said packaging film with a product;
    a sealing station for sealing said product in said cavities of said packaging film;
    wherein said insertion section is disposed downstream of said forming station and said sealing station is disposed downstream of said insertion station; and
    wherein at least a portion of said packaging film is continuous as said packaging film is transported through said forming station, said insertion section, and said sealing station.

13. The packaging machine as claimed in claim 1 wherein said compressed air store temporarily stores said volume of the compressed air generated by said device for generating compressed air prior to delivery to said forming tool upper part.

* * * * *